(12) United States Patent
Neuberger et al.

(10) Patent No.: US 12,307,681 B1
(45) Date of Patent: May 20, 2025

(54) PROGRAMMATIC GENERATION OF OBJECT IMAGES WITH POLYGONAL OUTLINES

(71) Applicant: Amazon Technologies, Inc., Seattle, WA (US)

(72) Inventors: Assaf Neuberger, Ness Ziona (IL); Arik Poznanski, Herzliya (IL); Nicole C. Bishop, Peterborough, NH (US)

(73) Assignee: Amazon Technologies, Inc., Seattle, WA (US)

( * ) Notice: Subject to any disclaimer, the term of this patent is extended or adjusted under 35 U.S.C. 154(b) by 375 days.

(21) Appl. No.: 17/806,929

(22) Filed: Jun. 14, 2022

(51) Int. Cl.
*G06K 9/00* (2022.01)
*G06T 7/13* (2017.01)
*G06T 7/155* (2017.01)
*G06T 7/194* (2017.01)

(52) U.S. Cl.
CPC ............... *G06T 7/194* (2017.01); *G06T 7/13* (2017.01); *G06T 7/155* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 6,937,760 | B2 * | 8/2005 | Schoepflin | G06T 7/155 |
| | | | | 382/199 |
| 8,565,525 | B2 * | 10/2013 | Rossato | G06T 7/12 |
| | | | | 382/199 |
| 9,881,207 | B1 * | 1/2018 | Nguyen | G06V 40/103 |
| 10,475,186 | B2 * | 11/2019 | Somanath | G06T 7/174 |
| 10,964,078 | B2 * | 3/2021 | Wiesel | G06T 11/00 |
| 11,017,219 | B2 * | 5/2021 | Qi | G06T 7/74 |
| 11,544,884 | B2 | 1/2023 | Shuvi et al. | |
| 2015/0334398 | A1 * | 11/2015 | Socek | H04N 19/182 |
| | | | | 375/240.26 |
| 2018/0143756 | A1 | 5/2018 | Mildrew et al. | |
| 2020/0057487 | A1 * | 2/2020 | Sicconi | G06F 3/011 |
| 2022/0318892 | A1 * | 10/2022 | Lee | G06T 7/12 |
| 2024/0169670 | A1 * | 5/2024 | Zangenehpour | G06T 17/20 |

FOREIGN PATENT DOCUMENTS

| | | | | | |
|---|---|---|---|---|---|
| CN | 102999901 | A | * | 3/2013 | G06T 7/194 |
| CN | 113240679 | A | * | 8/2021 | G06N 3/045 |
| FR | 3060180 | A1 | * | 6/2018 | G06T 7/194 |

OTHER PUBLICATIONS

U.S. Appl. No. 17/806,836, Graphical User Interface Presenting User-Specific Garment Renderings, filed Jun. 14, 2022.

* cited by examiner

*Primary Examiner* — Shervin K Nakhjavan
(74) *Attorney, Agent, or Firm* — Knobbe, Martens, Olson & Bear, LLP

(57) ABSTRACT

Systems and methods are described for programmatic generation of object images with polygonal outlines. Programmatic generation can include obtaining a segmentation mask identifying pixels of a source image depicting an object, applying morphological dilation the segmentation mask to produce a dilated mask, applying a polygonal approximation algorithm to one or more contours within the dilation mask to produce a polygonal outline mask, and generating a synthetic image of the object on a designated background by overlaying a portion of the source image, designated by the segmentation mask, on to a portion of the designated background designated by the polygonal outline mask.

20 Claims, 12 Drawing Sheets

PROGRAMMATIC GENERATION OF OBJECT IMAGES WITH POLYGONAL OUTLINES

BACKGROUND

Image segmentation is a process for partitioning an image into image segments, for example to isolate an object depicted within the image. Manual image segmentation can be labor intensive, such as by requiring human intervention to manually label individual pixels of an image as corresponding to an object. Current programmatic segmentation techniques often yield imperfect results, leading to visible artifacts around a segmented portion of an image that can be readily apparent to human perception.

DETAILED DESCRIPTION

Generally described, aspects of the present disclosure relate to programmatic generation of synthetic object images with polygonal outlines. As described herein, a polygonal outline corresponds to an outline of an object in the form of a polygon—that is, a two dimensional shape with a set of sides connected by a set of vertices. The polygonal outline is illustratively padded, such that it is at least partly separated from an object within an image (e.g., by one or more pixels). The polygonal outline may illustratively be used to reduce the perception of segmentation errors that might occur when isolating an image of an object from a background. In one example, the polygonal outline may be used as a boundary to separate a segmented image of an object (e.g., as segmented from a source image containing a prior background), which segmented image exists within the polygonal outline along with a background of a first color (e.g., white), from a distinct background existing outside the polygonal outline, which may be added subsequent to segmentation. In this example, the polygonal outline may provide an impression of a "cut out", as if a human had physically cut the image of the object from paper and overlayed the physically cut image onto the distinct background. As a result, human perception of segmentation artifacts within the segmented image may be reduced.

Figure 1:
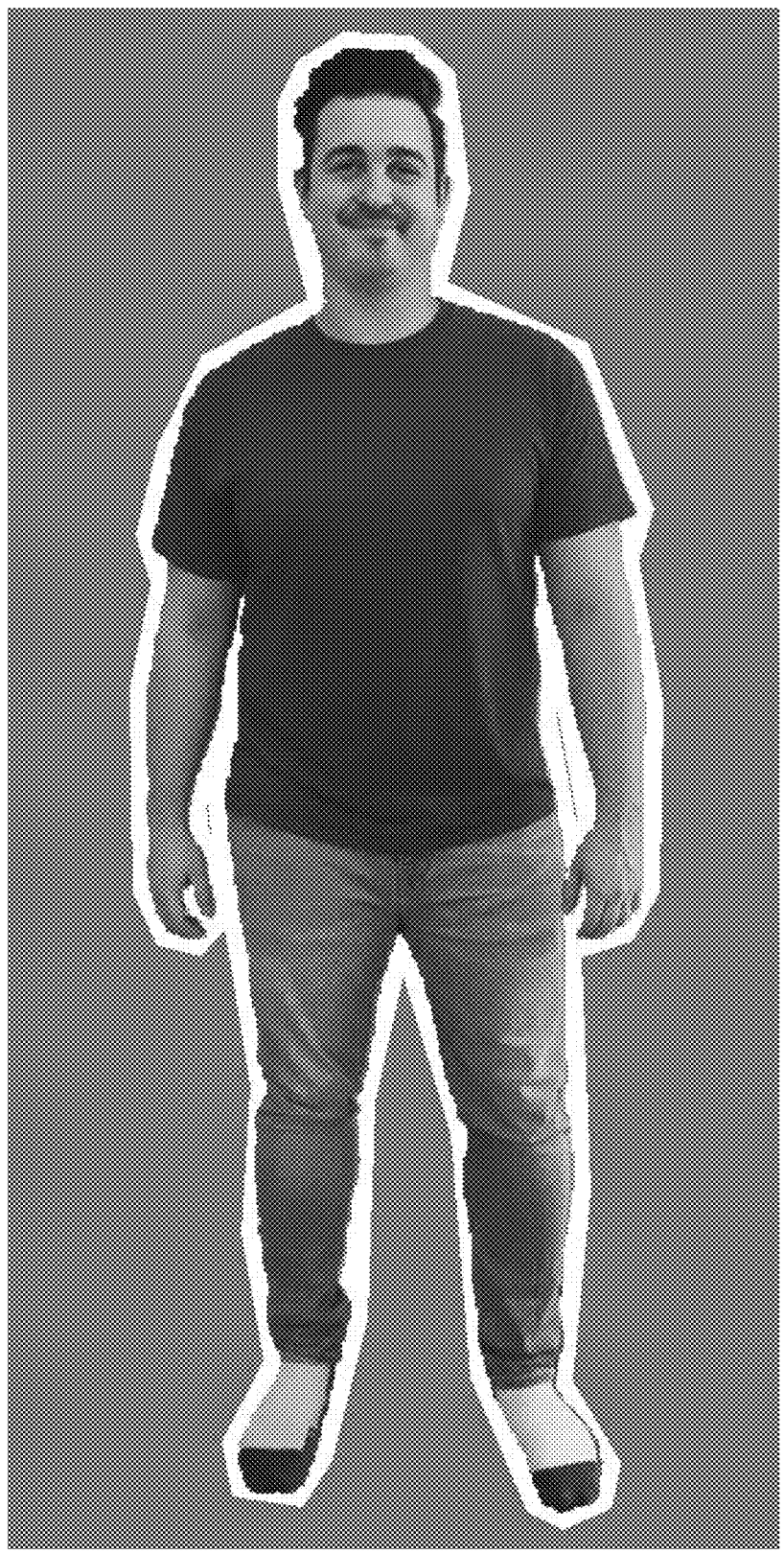
FIG. 1 depicts an object image with polygonal outline that may be generated in accordance with embodiments of the present disclosure.

One example of an object image with a polygonal outline that may be generated in accordance with the present disclosure is shown in FIG. 1. As shown in FIG. 1, the object image depicts a human subject. In FIG. 1, the image of the human subject has been extracted from a source image via segmentation, by identifying portions of the source image depicting the human subject. This segmentation process has introduced artifacts within FIG. 1, such that arms of the human subject are shown as jagged rather than smooth. However, perception of these artifacts is reduced by inclusion of a "paper cut" polygonal outline around the human subject, shown in white. This outline separates the image of the human subject from the external background (shown as grey in FIG. 1). Because the external background does not directly meet the image of the human subject, the perceptibility of segmentation artifacts is reduced. This perceptibility is further reduced as the polygonal image provides a set of linear boundaries against the external background, providing a smoothing effect.

The object image with a polygonal outline may be used in a variety of contexts. As one illustration, the object image may be used as part of a user interface for providing virtualized garment renderings-synthetic images depicting a human subject wearing various items of clothing. Illustratively, such a user interface may enable a user to swap clothing depicted on the human subject, such as by "swiping" through various clothing options with each option being depicted on the subject. One example of such an interface is disclosed in U.S. patent application Ser. No. 17/806,836, entitled "GRAPHICAL USER INTERFACE PRESENTING USER-SPECIFIC GARMENT RENDERINGS" (the "'836 Application"), filed Jun. 14, 2022, the entirety of which is incorporated herein by reference. Within such an interface, it may be desirable to isolate the subject from a background. However, it may be difficult or computationally expensive to conduct such isolation without introducing significant artifacts into a resulting image. Thus, an image with polygonal outline as generated via embodiments of the present disclosure may enable such a system to operate despite potential for such artifacts, for example reducing computational resources required to implement such a system by reducing resources required for conducting segmentation of an object from a source image.

One mechanism for creating object images with polygonal outlines is to manually create such outlines. For example, a human operator might obtain an image of an object segmented from a source image, and manually draw a polygon around the image of the object, selecting for example points for each vertex of the polygon, the location of each vertex, etc. This approach can be very tedious and time consuming. Moreover, the approach can lead to variance in final outcome, as manually created polygonal outlines are driven by subjective determinations rather than a specific, deterministic programmatic process. Manually created polygonal outlines can therefore provide inconsistent results relative to programmatically created outlines.

The present disclosure provides an alternative process, in which a computing device can programmatically generated polygonal outlines based on a defined algorithm, providing for fast, efficient, deterministic outline generation that avoids the tedious, time consuming, and varying outcomes of manual generation. Specifically, a polygonal outline generation process is disclosed herein that can modify an image of an object to provide a polygonal outline around the object. In one embodiment, the polygonal outline generation process includes applying image segmentation to a source image depicting the object to isolate the object from a background of the source image. The process can further include generating a binary mask identifying the location of the object within the source image, and dilating the binary mask such that the size of the mask increases to encompass an area around the object (providing "padding" around the object). The dilated mask can then be converted into a contour, representing pixels of the dilated mask as a continuous boundary. The boundary contour can then be passed through a polygon approximation algorithm, such as the Ramer-Douglas-Peucker algorithm (sometimes referred to as the "Douglas-Peucker algorithm"), to generate a polygonal outline mask. Thereafter, an object image with a polygonal outline can be generated by combining the object image (e.g., as generated by applying the binary segmentation mask to the source image) with a background image selected according to the polygonal outline mask (e.g., by inverting the polygonal outline mask and applying it to the background image). The space between the two masks can be filled with appropriate intermediate content, such as a single-color fill. This process can thus result in an object image with a polygonal outline, such as that shown in FIG. 1, without requiring subjective human creation of polygonal outlines.

The above-noted polygonal outline generation process will be further described with reference to FIGS. 2A-G, which a source image, intermediate images, and polygonal outline images that may be generated in accordance with embodiments of the present disclosure. Specifically, FIG. 2A depicts a source image depicting a human subject, FIGS. 2B-2F depict intermediate images that may be generated during the polygonal outline generation process, and FIG. 2G depicts two example object images with polygonal outlines, which outlines vary according to configurable parameters of the example polygonal outline generation process.

As noted above, FIG. 2A shows a source image depicting a human subject against a background. It can be desirable to isolate the portion of image depicting the human subject from a remainder of the image. For example, a computing system may wish to use the image of the human in various user interfaces, such as those of the '836 Application, above. To isolate the portion of the image depicting the subject, the image can be processed through an image segmentation algorithm. A variety of such algorithms are known in the art. For example, a machine learning model may be trained to segment an image into distinct segments, each of which represents (for example) an instance of an object detected within the image. In the current instance, the model may be trained to segment pixels representing humans from other pixels, and to group together each set of pixels representing a given human (here, a single human subject). The machine learning model may be, for example, a neural network, such as a convolutional neural network, trained to conduct segmentation based on a training data set that includes images labeled with pixel-level annotations identifying instances of objects in the data set. While a human subject is shown in FIG. 2A, embodiments of the present disclosure may generate polygonal outlines for various types of objects, including other living subjects, non-living objects, etc. Moreover, while a single subject is shown in FIG. 2A, embodiments of the present disclosure may generate polygonal outlines for multiple objects within a single image.

Figure 2A:
FIGS. 2A-2G visually depict a source image, intermediate images, and polygonal outline images that may be may be generated in accordance with embodiments of the present disclosure.
Figure 2B:
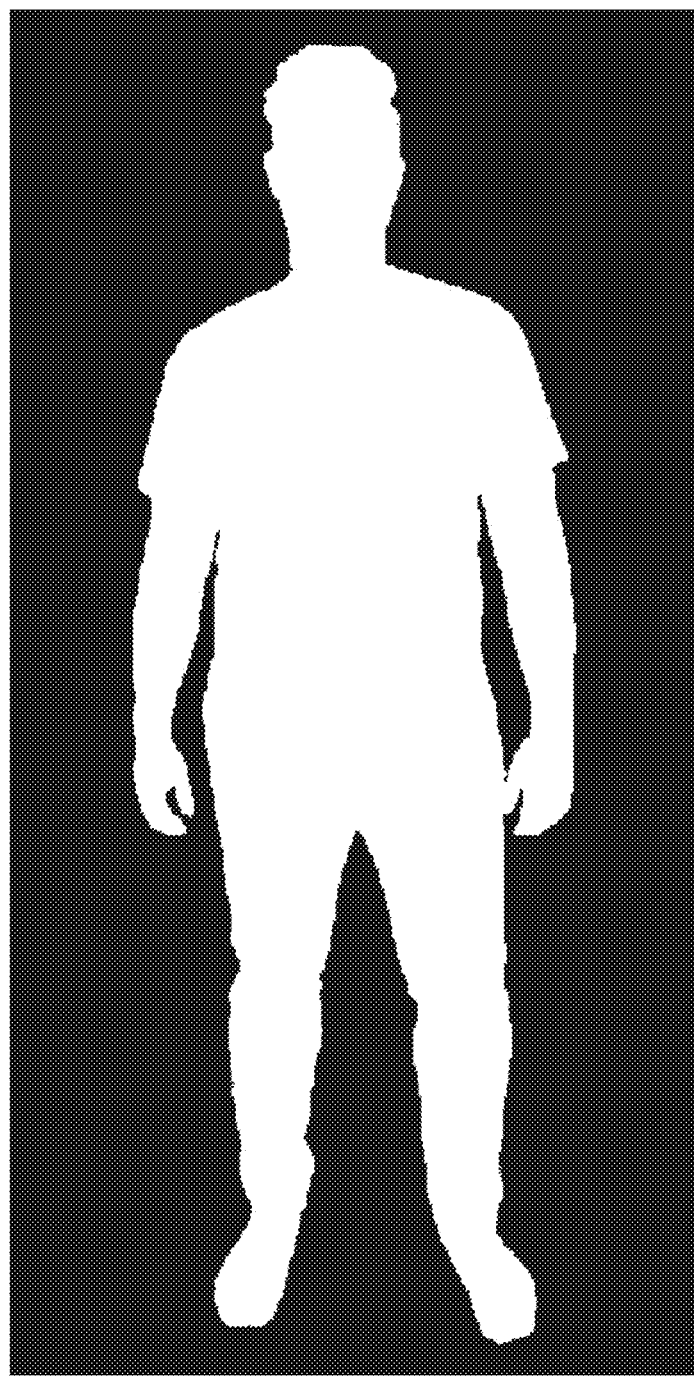

FIG. 2B depicts an example of an object mask generated by application of an image segmentation algorithm to the image of FIG. 2A. Specifically, in FIG. 2B, a binary object mask is shown, in which white portions identify pixels of the source image identified to represent the detected human subject, and black portions identify pixels of the source image not identified to represent the detected human subject. (Note that the dimensions of the mask in FIG. 2B are reduced relative to the image of FIG. 2A for illustrative purposes only.) While FIG. 2B is shown as a binary mask, in some embodiments non-binary masks may be used. For example, when multiple objects are detected in a source image, each may be associated with a distinct value that is assigned to pixels corresponding to that object (along with another value, such as a 0 or null value, indicating no object detected in the corresponding pixels). To generate polygonal outlines for each such object, these non-binary masks may be converted to a binary mask, such as by converting the value for pixels representing a given object to a first value and all other pixels to a second value in order to generate a polygonal outline for the object, and then repeating the process with respect to each object detected. Additionally or alternatively, polygonal outlines for each subject may be generated simultaneously, such converting the non-binary mask into a binary mask that distinguishes all objects from a background without distinction among the objects.

Because the mask of FIG. 2B identifies which pixels of the source image are detected to correspond to a human subject, the mask can be applied to the source image to isolate the portions of the source image depicting the human subject. For example, any pixels in the source image that correspond to a "0" or null value (shown as black in FIG. 2B) in mask may be removed, set to a defined background color, set to transparent, or the like, while any pixels in the source image that correspond to a "1" (shown as white in FIG. 2B) can be retained as shown in the source image.

Figure 2C:
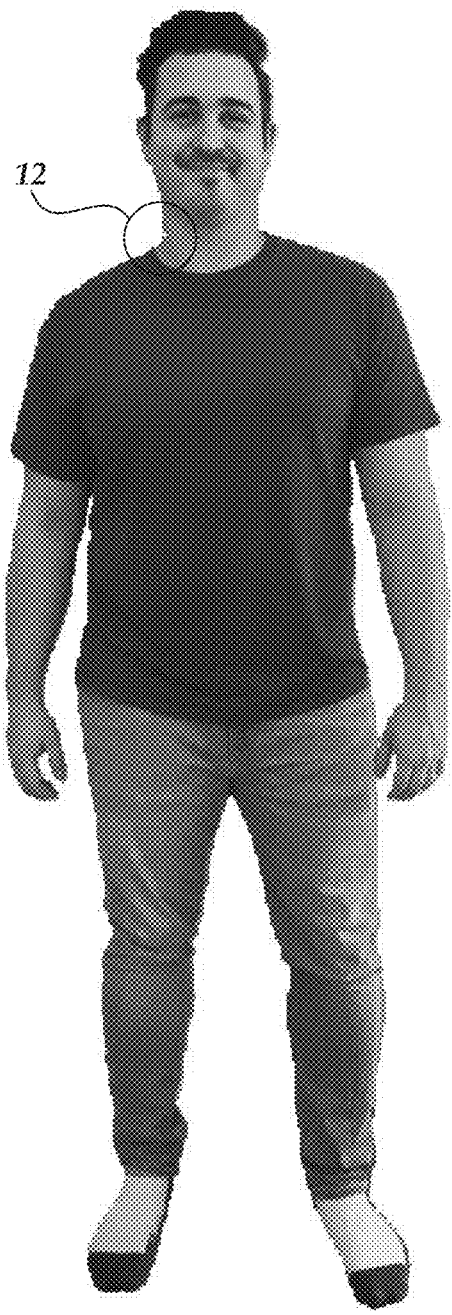

An example result of applying the mask of FIG. 2B to the source image of FIG. 2A is shown in FIG. 2C. As shown in FIG. 2C, the portion of the source image corresponding to the human subject has been isolated from a remainder of the image. However, the segmented image shown in FIG. 2C is imperfect, and contains segmentation artifacts resulting from imperfections within the segmentation algorithm. For example, the portion of the subject's neck shown at 12 shows a jagged edge that does not accurately reflect the line of the subject's neck in the source image. The segmented image in FIG. 2C further shows imperfections as a result of the image being represented by a limited set of pixels. For example, the arms and legs are shown as jagged, rather than smooth, lines. Human perception is often highly sensitive to these imperfections, especially with human subjects. Direct overlay of the segmented image of FIG. 2C onto a distinct background often highlights these imperfections.

To address this problem, embodiments of the present disclosure provide for generation of polygonal outlines for segmented images, which can be used to divide a segmented image from another background and thus minimize perceptible imperfections in the segmented image. Specifically, a polygonal outline may be generated based on manipulation of an object mask for a segmented object, which may be for example obtained during segmentation of the object or obtained from an image of the segmented object (e.g., by detection of non-background portions of the segmented image shown in FIG. 2C). An example process for generating a polygonal outline from a segmentation mask is shown in FIGS. 2C-2F.

Figure 2D:
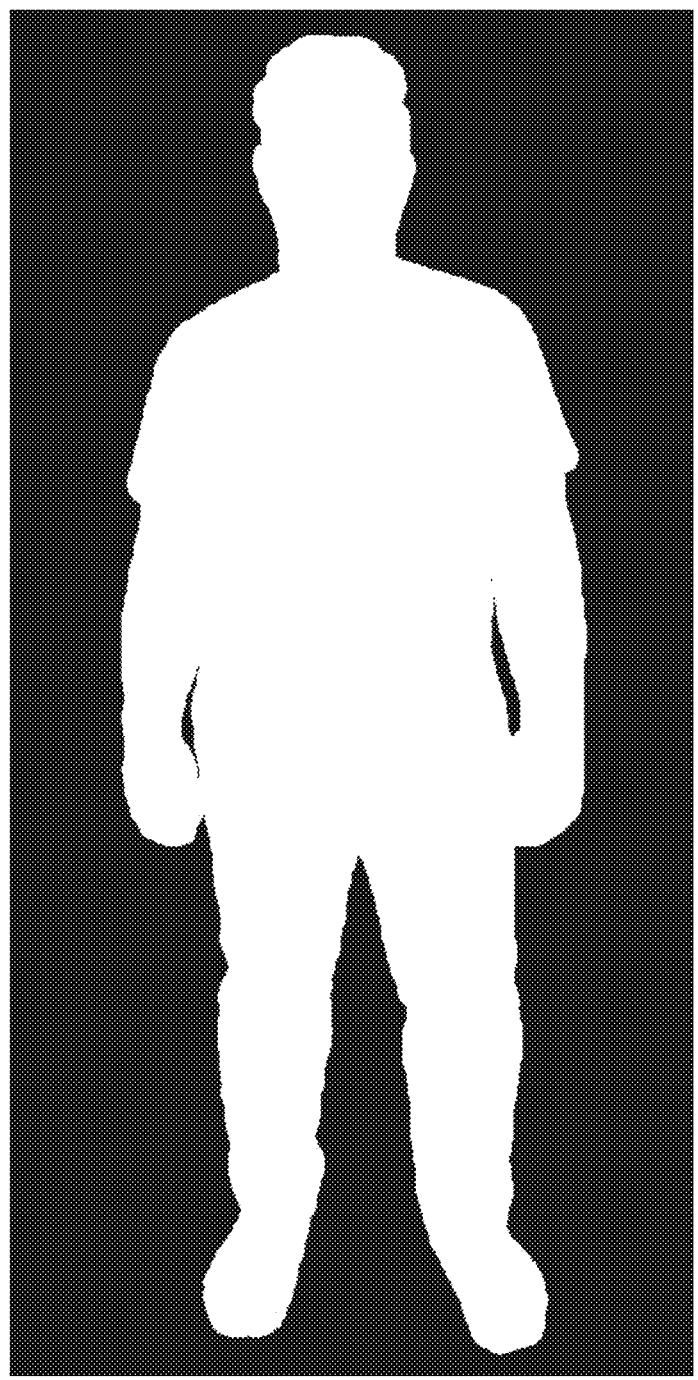

Specifically, FIG. 2D depicts a dilated mask, as generated from the segmentation mask of FIG. 2B by the morphological operation of dilation. This operation expands the mask, thus causing (in FIG. 2D) the white areas of the mask to "grow." In one embodiment, dilation operations by applying a kernel of a given size (e.g., a square or a circle or pixels) to each pixel of the image, and replacing an anchor point of the kernel, such as the center of the kernel, with a maximum value of any pixel within the kernel. Thus, as the kernel approaches an edge of the mask, the anchor point of the kernel, illustratively assumed to initially be black or have a low value, is replaced by a maximum value of the kernel (e.g., white). Thus, the mask of FIG. 2D is expanded relative to the mask of FIG. 2B. The scope of expansion can be set based on parameters for the dilation operation, such as by the size and shape of the kernel. In one embodiment, the kernel is vertically and horizontally symmetrical with an equal height and width, and the thickness of the polygonal outline is controlled by establishing the scale of the kernel. For example, a kernel with a height and width of n pixels may generally result in an outline with a width of n/2 pixels. In another embodiment, the kernel may be re-shaped to skew the outline in a desired direction. For example, a relatively tall kernel may be used to create a polygonal outline that is thicker vertically than horizontally, or vice versa, and a skewed kernel (e.g., with an off-center anchor) may be used to create a polygonal outline that is skewed similarly to the kernel.

Thereafter, an initial polygonal outline can be generated by applying a polygon approximation algorithm to the dilated mask. In one embodiment, the polygon approximation algorithm is the Ramer-Douglas-Peucker algorithm (sometimes referred to as the "Douglas-Peucker algorithm"). This algorithm is known in the art, and thus will not be described in detail herein. However, in brief, the Ramer-Douglas-Peucker algorithm operates to reduce a number of points required to represent a two-dimensional closed shape. The algorithm generally operates by recursively dividing the shape into lines based on a threshold distance, such that all points within the initial shape are within the threshold distance from a point within the final polygon generated by the algorithm. Thus, a relatively complex shape (e.g., a continuous curve) may be reduced into a relatively less complex shape. Other polygon approximation algorithms may alternatively be used.

To generate an initial polygonal outline, the dilated mask of FIG. 2D may initially be transformed into a set of curves joining all continuous points within the dilated mask, each curve being sometimes referred to as a contour. For example, the (dilated) outline of the human subject in FIG. 2D may be represented as a continuous curve. In some cases, multiple contours may exist within a dilated mask. For example, in FIG. 2D, a first contour can represent the outline of the human subject, a second contour can represent the gap between the subject's left arm and body, and a third contour can represent the gap between the subject's right arm and body. Each contour can illustratively be equivalent to the pixel representation of the contour, as transformed into a curve. For example, each contour may illustratively represent a polygon with vertexes at each edge pixel of the dilated mask (e.g., each border between black and white pixels).

Figure 2E:
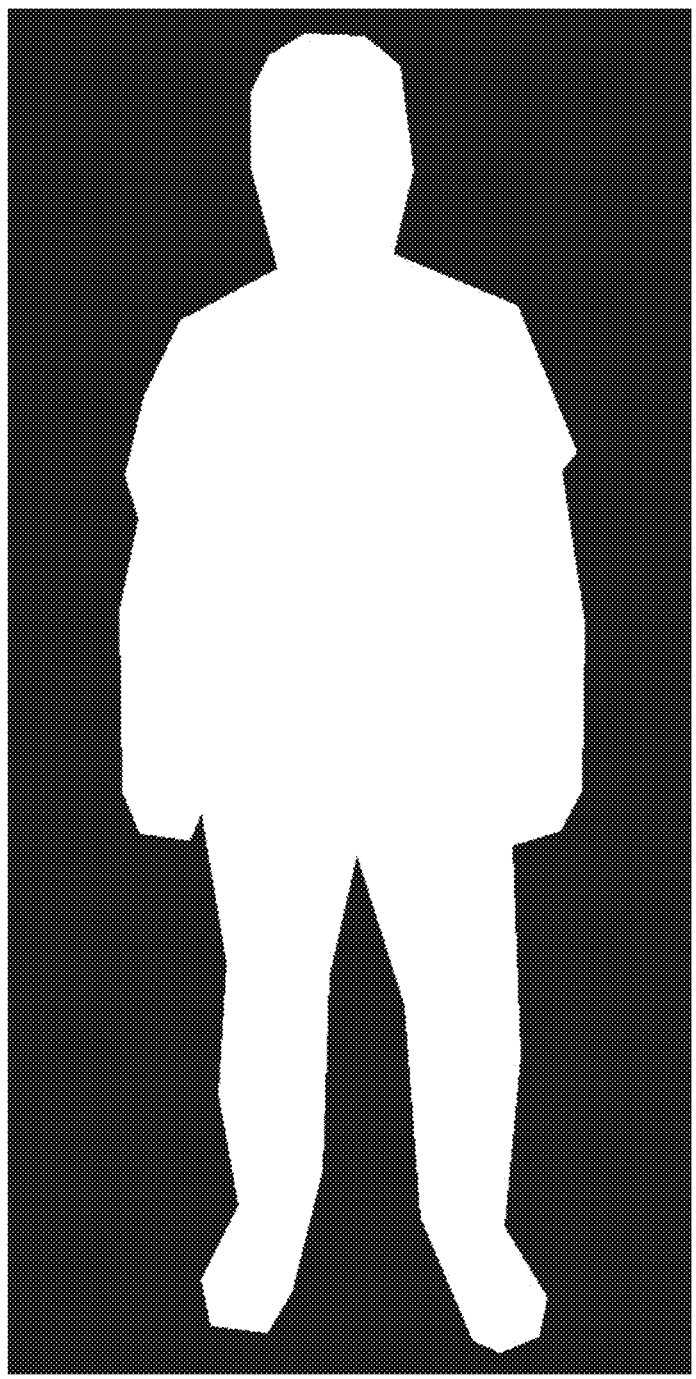

Thereafter, a polygon approximation algorithm can be applied to each contour to generate a reduced vertex polygon. The "jaggedness" of the polygon—e.g., corresponding to the number of vertexes in the polygon—may be controlled according to the parameters of the algorithm. For example, in the Ramer-Douglas-Peucker algorithm, the threshold distance between points may be reduced to increased the number of vertexes in the polygon (with the resulting polygon approaching the initial contour as the threshold approaches zero), and conversely may be increased to reduce a number of vertexes. One example of application of a polygon approximation algorithm to the dilated mask of FIG. 2D is shown in FIG. 2E. As shown in FIG. 2E, the contour representing the outside border of the subject has been modified into a polygonal outline, with a limited set of vertexes relative to the shape shown in FIG. 2D and edges connecting these vertexes.

In some instances, a dilated mask may include multiple contours. In one embodiment, the polygon approximation algorithm is applied to each contour independently. In another embodiment, the polygon approximation algorithm is applied to each contour that is not entirely subsumed within another contour. For example, the algorithm may be applied to a contour representing the outline of the human subject in FIG. 2D to result in the polygon of FIG. 2E. The algorithm may then be independently applied to subsumed contours contours that are entirely contained within another contour. These contours may represent, for example, the gaps between the body and limbs of a human subject, such as the gaps in FIG. 2D between the arms and body of the human subject. These gaps may be perceptively important, and thus it may be desirable to maintain these gaps. Accordingly, polygons corresponding to subsumed contours may be subtracted from a dilated mask. In one embodiment, the polygon approximation algorithm may be applied to subsumed contours with differing parameters, such as a reduced threshold distance, in order to ensure that such subsumed contours are adequately represented in a polygonal outline. For example, the polygon approximation algorithm may be applied to the subsumed contours of FIG. 2D with a reduced threshold distance, and the resulting subsumed polygons may be subtracted from the mask representing the polygon approximation of the outer contour. An example result of such addition is shown in FIG. 2F, where polygons representing the subsumed contours of FIG. 2D are subtracted from the polygon of FIG. 2E.

Figure 2F:
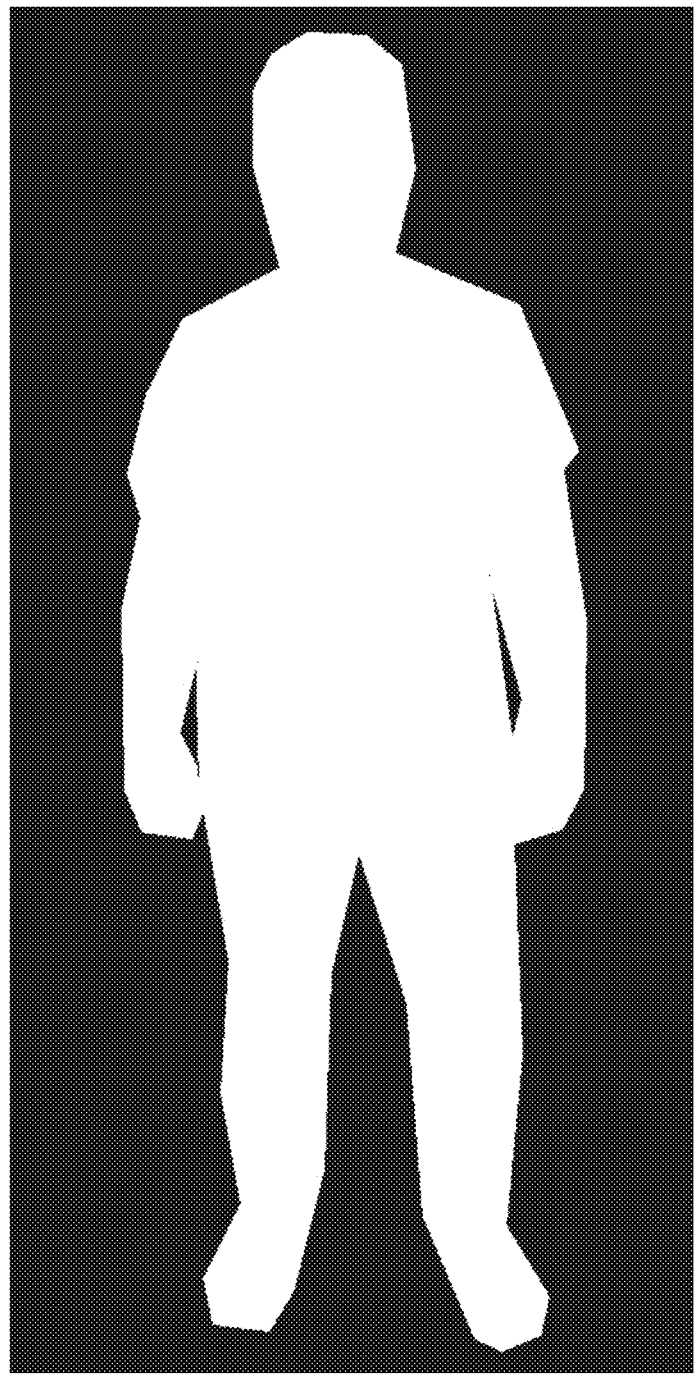
Figure 2G:
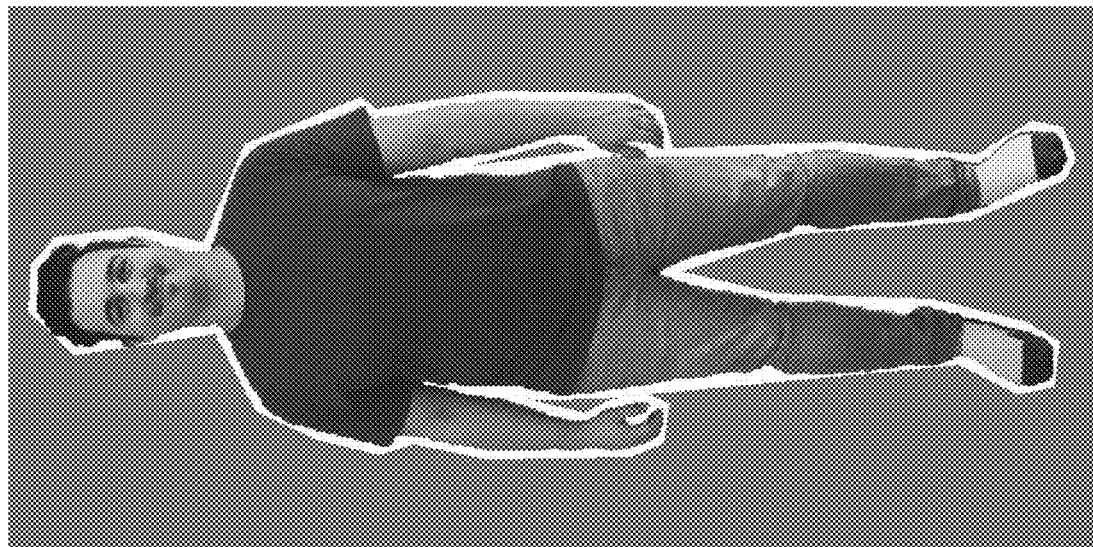
Figure 2G:
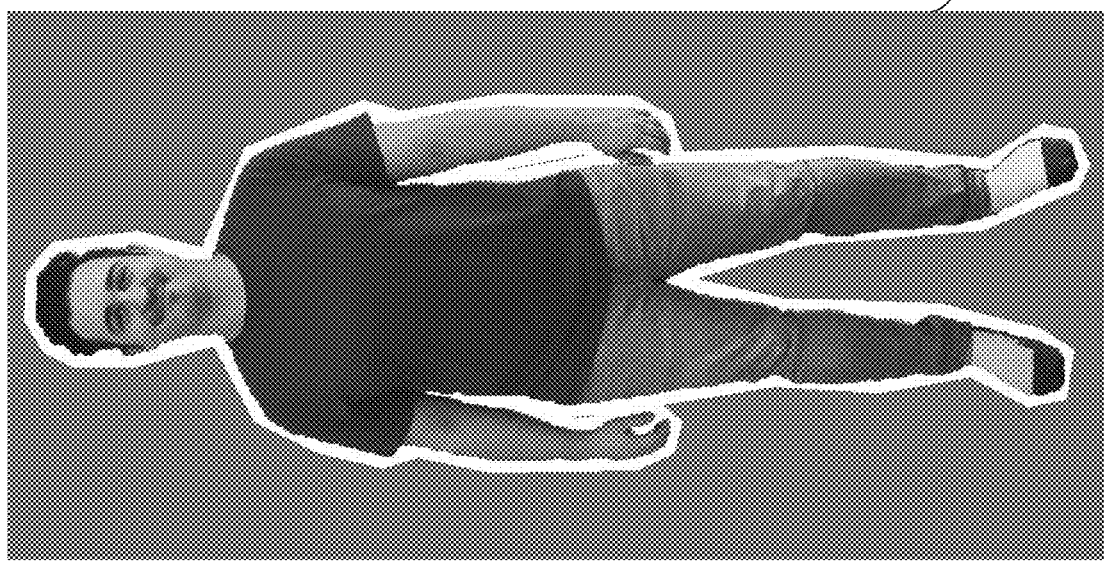

The result as shown in FIG. 2F can represent the polygonal outline mask of the subject shown in the source image of FIG. 2A. This polygonal outline mask, along with the segmentation mask of FIG. 2B, can then be applied to the source image and a distinct background image in order to generate an object image with a polygonal outline. For example, the segmentation mask of FIG. 2B can be applied to the source image to isolate the portion of the image depicting the relevant object (a "segmented image"), and the polygonal outline mask can be applied to the distinct background image (e.g., by inverting the polygonal outline mask and then selecting a portion of the background image according to the inverted mask) to generate a portion of the distinct background to merge with the image of the subject. The negative space between the segmented image of the human subject and the portion of the distinct background thus represents the polygonal outline of the subject, which outline may be colored appropriately to reduce the perception of flaws, such as segmentation flaws, on the segmented image. For example, the negative space may be filled with a solid color, such as white.

Example object images with polygonal outlines are shown in FIG. 2G as images 14 and 16. Specifically, each image 14 and 16 contains the segmented image of FIG. 2C, as isolated from the source image of FIG. 2A by application of the segmentation mask of FIG. 2B and a portion of a grey background, as generated by application of the polygonal outline mask of FIG. 2F to a purely grey background. The negative space dividing the polygonal outline mask and the segmentation mask is shown in FIG. 2G as white. In FIG. 2G, the images 14 and 16 differ in the configuration of the polygonal outline. For example, the outline in image 14 is thicker than that of image 16. These differences can result from modification of the parameters for generating a polygonal outline, such as the size of the dilation kernel, the threshold of the polygon approximation algorithm, or a combination thereof. For example, the thicker outline of image 14 can result from a larger kernel being applied to the dilation operation used to create a dilated mask. Thus, the configuration of polygonal outlines can be varied to suit a particular application of the outline.

As will be appreciated by one of skill in the art in light of the present disclosure, the embodiments disclosed herein improve the ability of computing systems to programmatically generate polygonal outlines for objects segmented from source images. Specifically, embodiments of the present disclosure remove a need to generate such outlines using a, tedious, time consuming, and varying manual process that relies on subjective human determinations. Rather, these embodiments replace such subjective human actions with a deterministic algorithm, distinct from that subjective human process, that can be programmatically applied to quickly, accurately, and repeatably generate polygonal outlines for images, which outlines may reduce perception of imperfections within images due to, e.g., segmentation errors or low resolution. Accordingly, the presently disclosed embodiments address technical problems inherent within such computing systems; specifically, the difficulties in conducting segmentation or presenting detailed objects in low resolutions without highly perceptible flaws. These technical problems are addressed by the various technical solutions described herein, including a process for programmatic generation of object images with polygonal outlines. Thus, the present disclosure represents an improvement in computer imaging and on computing systems in general.

Figure 3:
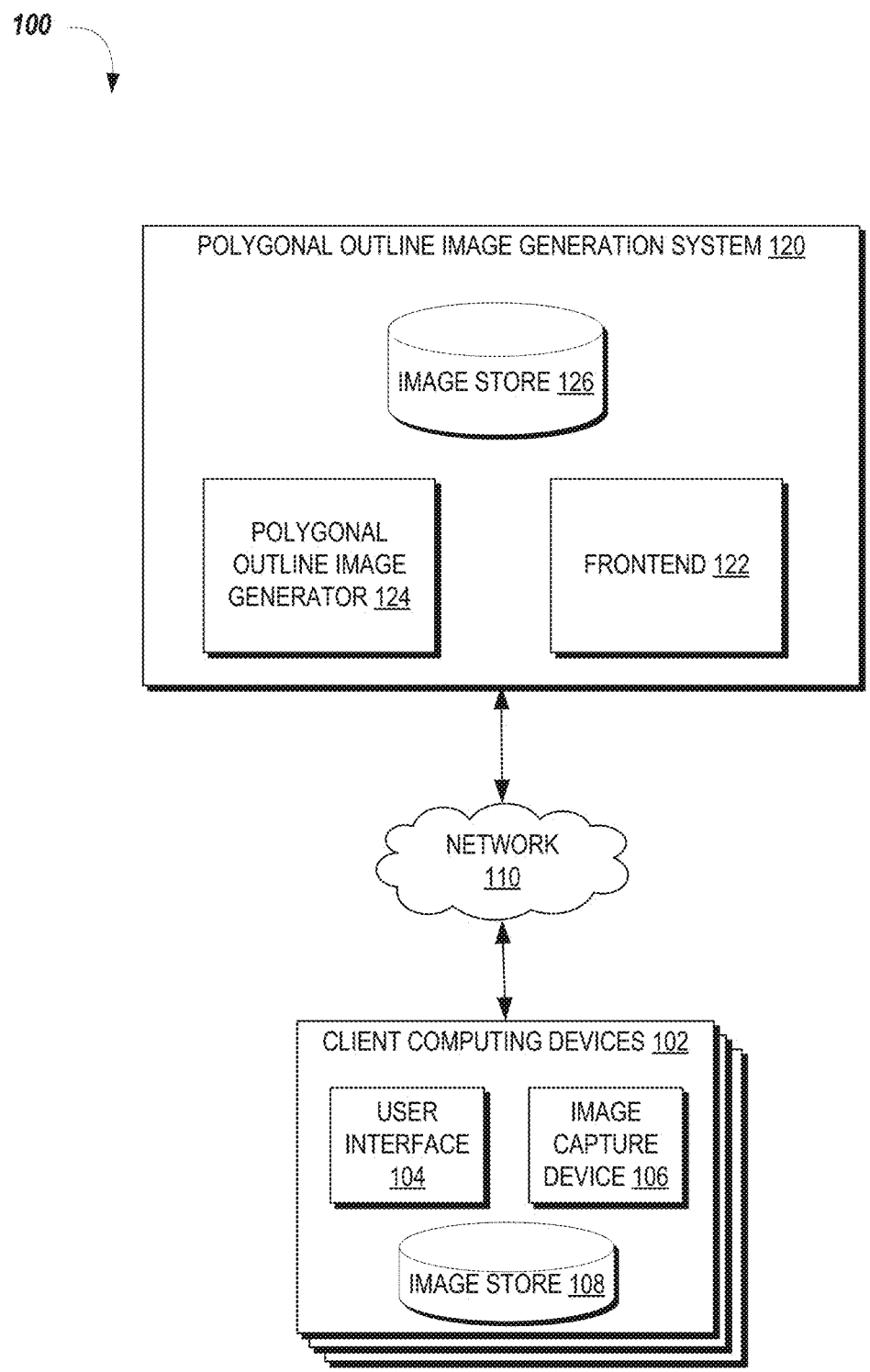
FIG. 3 depicts an illustrative environment in which a client device and a polygonal outline image generation system can interact to generate object images with polygonal outlines in accordance with embodiments of the present disclosure.

FIG. 3 depicts an example computing environment 100 including a polygonal outline image generation system 120 in which embodiments of the present disclosure can be implemented. Illustratively, the polygonal outline image generation system 120 can represent a network-accessible system providing for generating polygonal outline images (e.g., an image of an object with a polygonal outline), or masks enabling generation of such images.

The polygonal outline image generation system 120 can illustratively be accessed by client computing devices 102 over a network 110. The network 110 can include any appropriate network, including an intranet, the Internet, a cellular network, a local area network or any other such network or combination thereof. In FIG. 3, the network 110 is the Internet. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, set top boxes, virtual reality headsets, gaming consoles, and the like. The client computing devices 102 illustratively include a user interface 104 for accessing the polygonal outline image generation system 120. In one embodiment, the interface 104 represents or is provided by an application executing on the devices 102, such as a native application provided by the polygonal outline image generation system 120 or a web browser application (e.g., rendering a web page provided by the polygonal outline image generation system 120). The client device 102 as illustrated further includes an image capture device 106, such as a camera, which is configured to enable capturing of images including objects for which polygonal outlines are desired. While shown as including an image capture device 106, in some instances a client computing device 102 may exclude an image capture device 106 and may submit to the polygonal outline image generation system 120 source images otherwise acquired on the device 102 (e.g., by reading such an image from a memory card inserted into the client computing device 102). The client device 102 further includes an image store 108, which represents a persistent or substantially persistent data store, such as solid state memory, a disk drive, or the like. The image store 108 illustratively includes a source image depicting one or more objects for which a user of the client computing device 102 desires to create a polygonal outline image.

In accordance with embodiments of the present disclosure, a user of the client computing device 102 can interact with the polygonal outline image generation system 120 over the network 110 in order to generate object images with polygonal outlines. For example, the user interface 104 may provide an interface as disclosed in the '836 Application incorporated by reference above, which interface may utilize polygonal outlines. Accordingly, the device 102 may submit a source image to the polygonal outline image generation system 120 and obtain, in response, an object image with a polygonal outline. Additionally or alternatively, the device 102 may obtain in response one or more masks enabling creation of an object image with a polygonal outline, such as a segmentation mask for an object in the source image and a polygonal outline mask for creation of a polygonal outline around the object.

As noted above, the polygonal outline image generation system 120 can support creation of object images with polygonal images from source images depicting objects. The polygonal outline image generation system 120 illustratively includes a frontend 122 enabling submission of source images from client computing devices 102 and delivery of responsive content to the device 102, such as object images with polygonal outlines, masks facilitating creation of such images, or both. The frontend 122 may provide any number of interfaces, including graphical user interfaces (GUIs) such as webpages, command line interfaces (CLIs), application programming interfaces (APIs), or the like. Accordingly, the client computing device 102 (e.g., via the user interface 104) can interact with the polygonal outline image generation system 120 to submit source images and obtain responsive content.

To facilitate creation of that responsive content, the polygonal outline image generation system 120 includes a polygonal outline image generator 124. The generator 124 illustratively implements the algorithms disclosed herein, such as the routine 500 described below, to programmatically generate object images with polygonal outlines, masks facilitating generation of such images, or both. For example, the generator 124 may, when provided with the source image of FIG. 2A, generate images corresponding to those of FIGS. 2B-2G according to the processes described above. Thus, when given a source image, the generator 124 may generate a segmentation mask and polygonal outline mask. The generator may further generate an object image with polygonal outline may applying these masks to a source image and distinct background, thus providing an image of an object in the source image with a polygonal outline against the background.

To store data associated with creation of polygonal outlines, the polygonal outline image generation system 120 further includes an image store 126, which can correspond to any persistent or substantially persistent storage, such as a solid state storage, a disk drive, network attached storage, or the like. In one embodiment, the image store 126 stores source images, segmentation masks, polygonal outline masks, and object images with polygonal outlines. To preserve privacy of content in, e.g., source images, the image store 126 may be encrypted or provide other security sufficient to ensure privacy and confidentiality to users of client computing devices 102. In another embodiment, to further ensure privacy and confidentiality, the image store 126 is configured not to store source images, and may instead store data enabling creation of object images with polygonal outlines when such a source image is supplied (e.g., such data including segmentation and polygonal outline masks). For example, the polygonal outline image generation system 120 may require that a client computing device 102 provide a source image, and may transiently store source images during creation of a segmentation mask. As another example, the polygonal outline image generation system 120 might never operate on source images, but may require that a device 102 conduct segmentation and provide a segmentation mask to the polygonal outline image generation system 120 for creation of a polygonal outline mask, which mask may be returned to the device 102 such that the device 102 can generate an object image with polygonal outlines for the source image.

The polygonal outline image generation system 120 is depicted in FIG. 3 as operating in a distributed computing environment including several computer systems that are interconnected using one or more computer networks (not shown in FIG. 3). The polygonal outline image generation system 120 can also operate within a computing environment having a fewer or greater number of devices than are illustrated in FIG. 3. Thus, the depiction of the polygonal outline image generation system 120 in FIG. 3 should be taken as illustrative and not limiting to the present disclosure. For example, the polygonal outline image generation system 120 or various constituents thereof could implement various Web services components, hosted or "cloud" computing environments, and/or peer to peer network configurations to implement at least a portion of the processes described herein. Moreover, the environment 100 may include additional elements not shown in FIG. 3.

Further, the polygonal outline image generation system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 4:
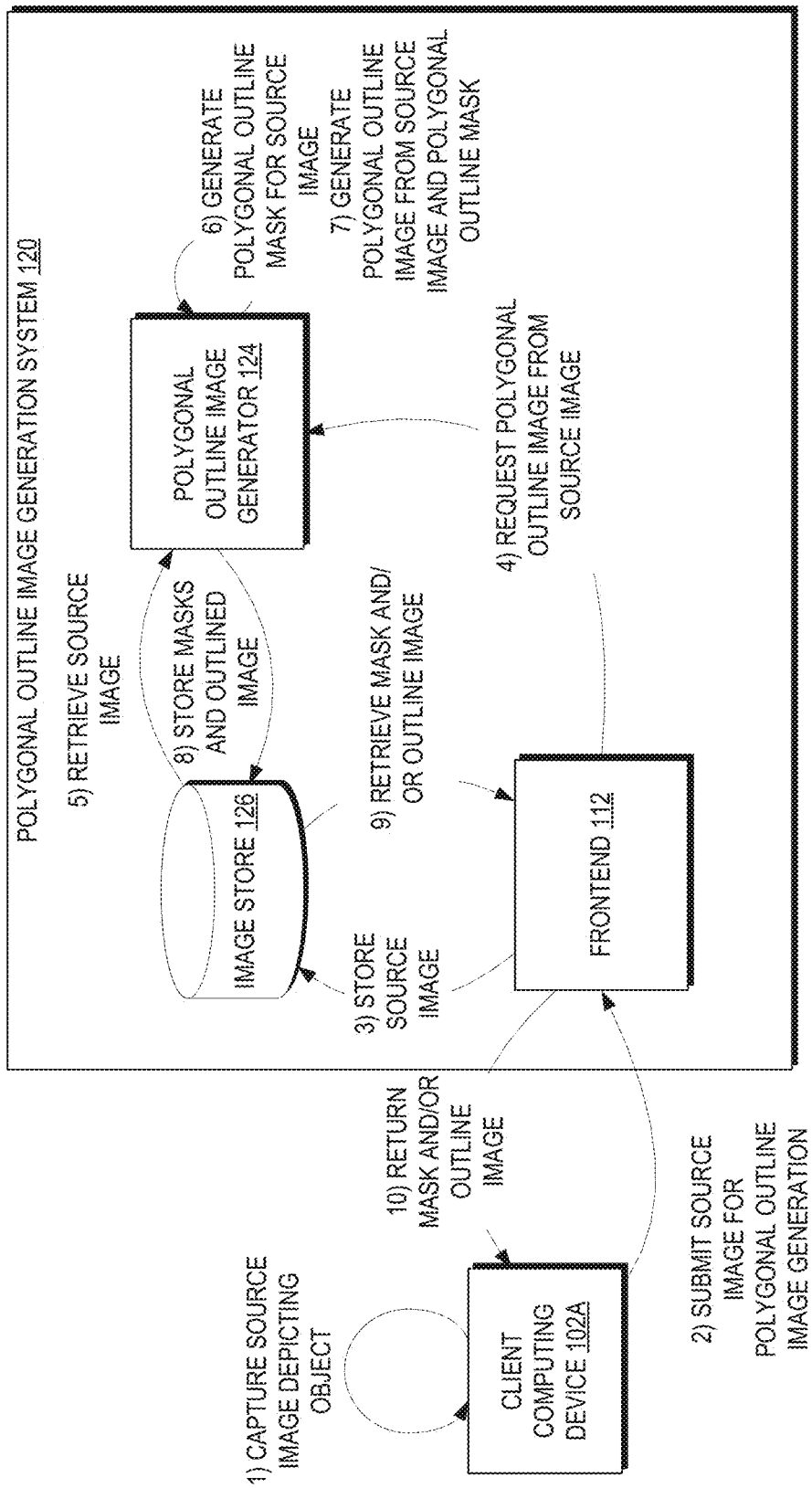
FIG. 4 depicts illustrative interactions for utilizing the polygonal outline image generation system of FIG. 3 to generate object images with polygonal outlines in accordance with embodiments of the present disclosure.

With reference to FIG. 4, illustrative interactions will be described for creation of an object image with polygonal outline from a source image, in accordance with embodiments of the present disclosure. The interactions begin at (1), where a client computing device 102A captures a source image depicting an object. For example, a user of the device 102A may capture a source image depicting a human subject using an image capture device 106. At (2), the device 102A submits the source image for polygonal outline generation to the frontend 112. For example, a user of the device 102A may interact with a user interface 104 to submit the source image. While submission of a source image is depicted in FIG. 4, the device 102A may additionally or alternatively submit a segmentation mask of the source image after conducting a segmentation process at the client computing device 102A (e.g., similar to the segmentation process that may otherwise be implemented at the polygon outline image generator 124). Illustratively, submission of a segmentation mask without source image may preserve privacy and confidentiality of the source image.

At (3), the frontend 112 stores the source image (and additionally or alternatively the segmentation mask, if received) in the image store 126, and requests at (4) that the polygonal outline image generator 124 generate a polygonal outline image for the source image. In some embodiments, the source image (and additionally or alternatively the segmentation mask, if received), may be provided directly to the polygonal outline image generator 124 (e.g., to avoid storage in the image store 126 for privacy or security purposes). In other embodiments, the polygonal outline image generator 124 may detect the source image (and additionally or alternatively the segmentation mask, if received) in the image store 126, thus avoiding interaction (4) which may be omitted.

At (5), the polygonal image generator 124 retrieves the source image (and additionally or alternatively the segmentation mask, if obtained at the system 120). Thereafter, the generator 124 generates a polygonal outline mask for the source image at (6). Illustratively, the generator 124 may generate the polygonal outline mask for the source image by dilating a segmentation mask for the source image (which may for example be generated at the generator 124 or obtained from the client computing device 102A) and applying a polygonal approximation algorithm to the dilated segmentation mask. In addition, at (7), the generator 124 generates a polygonal outline image from the source image and the polygonal outline mask. For example, the generator 124 can apply the segmentation mask, as used to generate the polygonal outline mask, to the source image to generate a segmented image of an object, apply the polygonal outline mask to a background image (e.g., by inverting the polygonal outline mask and then selecting a portion of the background image according to the inverted mask) to generate a background, and overlay the segmented image onto the generated background to create an object image with polygonal outline. Additional details regarding operation (6) and (7) are described with reference to the routine 500 of FIG. 5, below. While generation of an object image with polygonal outline (a "polygonal outline image") is depicted in FIG. 4 as occurring at the generator 124, in some embodiments interaction (7) may additionally or alternatively be performed at the client computing device 102A on the basis of information provided by the system 120, as generated by the generator 124 (e.g., a polygonal outline mask).

At (8), the generator 124 stores the segmentation mask, the polygonal outline mask, and the polygonal outline image in the image store 126. At (9), the mask, image, or both may is retrieved by the frontend 112 and returned to the client computing device 102A, at (10). While FIG. 4 depicts storage of the masks and image in the store 126, in some embodiments all or a portion of such data can be returned directly from the generator 124 to the frontend 112, or directly from the generator 124 to the client device 102A.

Accordingly, a client computing device 102A can, via the interactions of FIG. 4, provide a source image or segmentation mask for a source image and be provided with an object image with a polygonal outline, a polygonal outline mask enabling creation of such an object image, or both. The client device 102A may thereafter display the object image with polygonal outline, thus enabling display of the segmented object while reducing perception of flaws within the segmented object, such as segmentation flaws or flaws due to low resolution.

Figure 5:
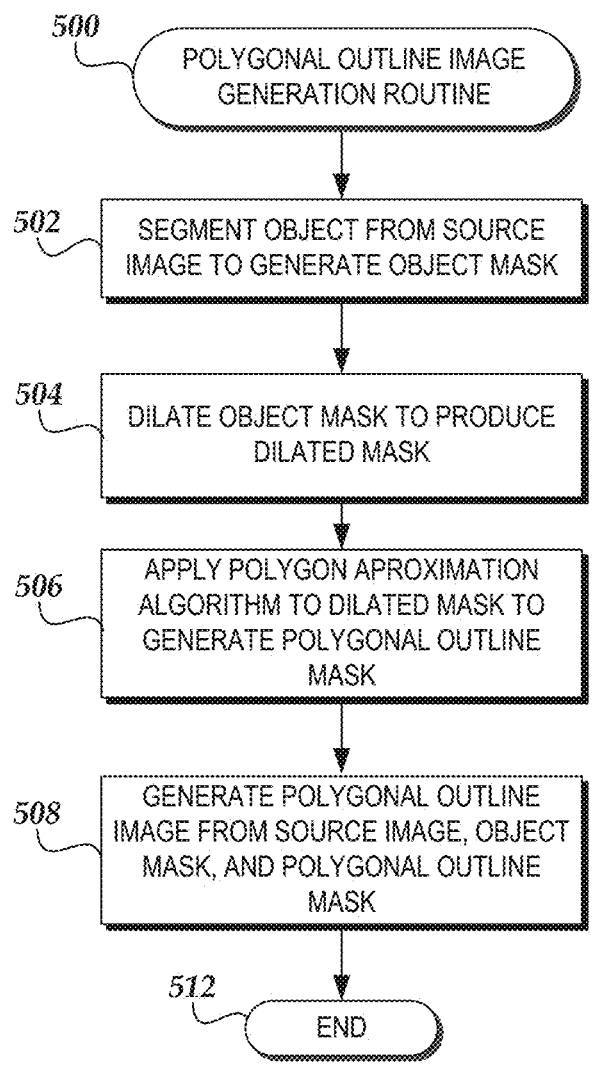
FIG. 5 is a flow chart depicting an illustrative routine implemented by the polygonal outline image generation system of FIG. 3 to generate object images with polygonal outlines in accordance with embodiments of the present disclosure.

With reference to FIG. 5, an illustrative routine 500 will be described for generation of object images with polygonal outlines, in accordance with embodiments of the present disclosure. The routine 500 may be implemented, for example, by a generator 124 of the system 120 of FIG. 3, independently or in combination with other elements of FIG. 3, such as a client computing device 102. The routine 500 is illustratively applied to a given source image, which may depict an object to be outlined.

The routine 500 begins at block 502, where the generator 124 (or potentially another device, such as a client computing device 102) segments the object depicted in the source image from the source image, to generate an object mask. As discussed above, segmentation may occur via a variety of known segmentation techniques, such as edge detection, application of a machine learning model (e.g., a trained convolutional neural network), or the like. Generally described, segmentation can identify pixels within the source image believed to represent an object, and generate a mask (which may be referred to as an object mask or segmentation mask) that corresponds to such pixels. The routine 500 is illustratively described with respect to a single object. However, if segmentation identifies multiple objects within the source image, the routine 500 may be repeated for each such object.

At block 504, the generator 124 dilates the object mask. As noted above, dilation illustratively corresponds to a morphological operation that "grows" the mask to include additional pixels. Illustratively, dilation can occur via application of a kernel to the object mask, such that an anchor point of the kernel is made positive (e.g., a value of 1) when any pixel within a current location of the kernel is positive. As discussed above, a shape of the kernel may be selected in order to control parameters of the polygonal outline, such as by increasing a scale of the kernel to increase a thickness of the outline, alternating a relative height and width of the kernel to alter a relative vertical and horizontal thickness of the outline, or skewing the kernel relative to an anchor point to similarly skew the outline.

At block 506, the generator 124 applies a polygonal approximation algorithm to the dilated mask to generate a polygonal outline mask. Illustratively, the generator 124 convert the dilated mask to one or more contours representing edges of the mask (e.g., where values change), and then apply the Ramer-Douglas-Peucker algorithm to each contour to generate corresponding polygons for each contour. Parameters of the algorithm may be set according to desired characteristics of the polygonal outline, for example by setting a threshold value for the algorithm according to the desired number of vertexes in the outline. In some embodiments, the algorithm may be applied with different parameters for outer contours (e.g., those not subsumed within another contour) and subsumed contours. For example, the threshold distance for subsumed contours may be reduced to ensure that these contours are adequately represented in the polygonal outline mask.

At block 508, the generator 124 utilizes the polygonal outline mask, segmentation mask, source image, and a desired background image to generate an object image with polygonal outline. Specifically, the generator 124 can apply the segmentation mask to the source image to isolate a portion of the source image representing an object or subject, thus generating a segmentation image. The generator 124 can further apply the polygonal outline mask to the desired background image (e.g., by inverting the polygonal outline mask and then selecting a portion of the background image according to the inverted mask) to generate a background portion. The segmented image can then be overlayed onto the background portion, with the negative space between the two filled with appropriate intermediary content (e.g., solid white), to generate an object image with polygonal outline. The term "overlay", as used herein, is intended to encompass layering of two image portions (e.g., a segmented image and a background portion), without regard to the ordering of such layering. For example, overlay may include layering a segmented image over a background portion, a background portion over a segmented image, etc. Accordingly, use of the term should not imply a particular ordering during combination of image portions. As noted above, in some instances block 508 may be implemented by another element, such as a client device 102. The routine 500 then ends at block 512.

Accordingly, by implementation of the routine 500, a computing device may programmatically generate object images with polygonal outlines, avoiding need for manually generating such images, and enabling a reduction in perception of imperfections within segmented images.

While FIG. 5 is described with reference to operation of a polygonal outline image generation system 120, in some embodiments the routine 500 may be implemented in whole or in part by another device, such as a client computing device 102.

Figure 6:
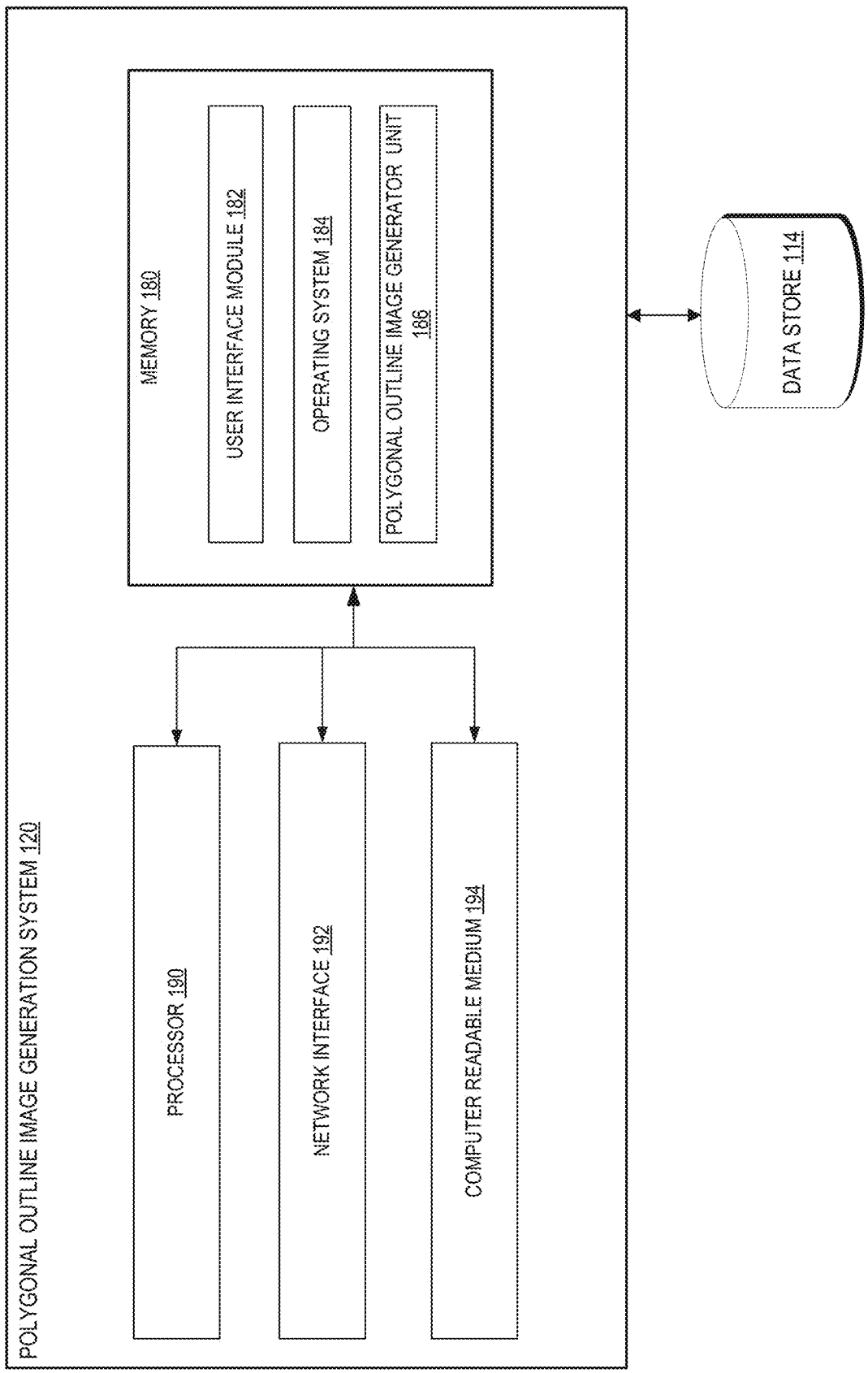
FIG. 6 depicts a general architecture of a computing device configured to implement the polygonal outline image generation system of FIG. 3.

FIG. 6 depicts an example architecture of a computing system (referred to as the polygonal outline image generation system 120) that can be used to perform one or more of the techniques described herein or illustrated in FIGS. 1-5. The general architecture of the polygonal outline image generation system 120 depicted in FIG. 6 includes an arrangement of computer hardware and software modules that may be used to implement one or more aspects of the present disclosure. The polygonal outline image generation system 120 may include many more (or fewer) elements than those shown in FIG. 6. It is not necessary, however, that all of these elements be shown in order to provide an enabling disclosure. As illustrated, the polygonal outline image generation system 120 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 110 illustrated in FIG. 3.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the polygonal outline image generation system 120. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 includes a polygonal outline image generator unit 186. In one embodiment, the polygonal outline image generation system 120 when executed implements various aspects of the present disclosure, e.g., generating polygonal outline masks, generating object images with polygonal outlines, and/or other aspects discussed herein or illustrated in FIGS. 1-5. Illustratively, the polygonal outline image generator unit 186 may include code corresponding to the polygonal outline image generator 124.

While the polygonal outline image generator unit 186 is shown in FIG. 6 part of the polygonal outline image generation system 120, in other embodiments, all or a portion of the polygonal outline image generator unit 186 may be implemented by another computing device. For example, in certain embodiments of the present disclosure, another computing device in communication with the polygonal outline image generation system 120 may include several modules or components that operate similarly to the modules and components illustrated as part of the polygonal outline image generation system 120. In some instances, the polygonal outline image generator unit 186 may be implemented as one or more virtualized computing devices. Moreover, the polygonal outline image generator unit 186 may be implemented in whole or part as a distributed computing system including a collection of devices that collectively implement the functions discussed herein.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for generating images of objects with polygonal outlines against distinct backgrounds, the computer-implemented method comprising:
    obtaining a source image depicting a human subject against a first background;
    applying image segmentation to generate a segmentation mask for the source image, the segmentation mask indicating pixels of the source image that depict the human subject and distinguishing the pixels of the source image that depict the human subject from pixels of the source image depicting the first background;
    applying a morphological dilation operation to the segmentation mask to generate a dilated mask;
    detecting a contour within the dilated mask, the contour representing a border of the dilated mask corresponding to a dilated outline of the human subject within the source image;
    applying a polygonal approximation algorithm to the contour within the dilated mask to generate a polygonal outline mask, wherein the polygonal outline mask is generated based in part on a jaggedness parameter that is provided as an input to the polygonal approximation algorithm;
    generating an image of the human subject with a polygonal outline against a second background by overlaying a portion of the source image, designated by the segmentation mask, on to a portion of the second background designated by the polygonal outline mask; and
    causing display of the image of the human subject against the second background to a user.

2. The computer-implemented method of claim 1, wherein generating the image further comprises filling a negative space between the portion of the source image and the portion of the second background with designated content.

3. The computer-implemented method of claim 2, wherein the designated content is solid white.

4. The computer-implemented method of claim 1, wherein the polygonal approximation algorithm is the Ramer-Douglas-Peucker algorithm.

5. One or more non-transitory computer-readable media comprising computer-executed instructions that, when executed by a computing system, cause the computing system to:

obtain a segmentation mask for a source image, the segmentation mask indicating pixels of the source image that depict an object and distinguishing the pixels of the source image that depict the object from pixels of the source image depicting a first background within the source image;

apply a morphological dilation operation to the segmentation mask to generate a dilated mask;

apply a polygonal approximation algorithm to a contour within the dilated mask to generate a polygonal outline mask, wherein the polygonal outline mask is generated based in part on a jaggedness parameter that is provided as an input to the polygonal approximation algorithm;

generate an image of the object with a polygonal outline against a second background by overlaying a portion of the source image, designated by the segmentation mask, on to a portion of the second background designated by the polygonal outline mask; and cause display to a user of the image of the object with the polygonal outline against the second background.

6. The one or more non-transitory computer-readable media of claim 5, wherein the morphological dilation operation comprises application of a kernel to the segmentation mask, and wherein the dilated mask is generated according to a shape of the kernel.

7. The one or more non-transitory computer-readable media of claim 6, wherein the computer-executed instructions further cause the computing system to obtain a shape parameter for the kernel that controls a thickness of the polygonal outline.

8. The one or more non-transitory computer-readable media of claim 7, wherein the shape parameter controls at least one of a height of the kernel, a width of the kernel, or a skewness of the kernel.

9. The one or more non-transitory computer-readable media of claim 5, wherein the segmentation mask is a binary mask.

10. The one or more non-transitory computer-readable media of claim 5, wherein the object is a first object, wherein the segmentation mask is a non-binary mask that further distinguishes pixels of the source image that depict a second object from the pixels of the source image depicting the first background, and wherein the computer-executed instructions further cause the computing system to convert the segmentation mask into a binary mask.

11. The one or more non-transitory computer-readable media of claim 5, wherein the image is further generated by filling a negative space between the portion of the source image and the portion of the second background with designated content.

12. The one or more non-transitory computer-readable media of claim 5, wherein execution of the computer-executable instructions causes the computing system to obtain the segmentation mask by applying a segmentation process to the source image.

13. A computing system comprising:
a non-transitory data store including computer-executable instructions; and
a processor configured to execute the computer-executable instructions, wherein execution of the computer-executable instructions causes the computing system to:
obtain a segmentation mask for a source image, the segmentation mask indicating pixels of the source image that depict an object and distinguishing the pixels of the source image that depict the object from pixels of the source image depicting a first background within the source image;
apply a morphological dilation operation to the segmentation mask to generate a dilated mask;
apply a polygonal approximation algorithm to a contour within the dilated mask to generate a polygonal outline mask, wherein the polygonal outline mask is generated based in part on a jaggedness parameter that is provided as an input to the polygonal approximation algorithm; and
cause display to a user of an image of the object with a polygonal outline against a second background, the image of the object generated by overlaying a portion of the source image, designated by the segmentation mask, on to a portion of the second background designated by the polygonal outline mask.

14. The computing system of claim 13, wherein execution of the computer-executable instructions causes the computing system to obtain the segmentation mask by applying a segmentation process to the source image.

15. The computing system of claim 14, wherein applying the segmentation process comprises applying edge detection to the source image.

16. The computing system of claim 14, wherein applying the segmentation process comprises passing the source image through a convolutional neural network trained to conduct segmentation.

17. The computing system of claim 13, wherein the computer-executed instructions cause the computing system to apply the polygonal approximation algorithm to multiple contours within the dilated mask to generate the polygonal outline mask.

18. The computing system claim 17, wherein the computer-executed instructions cause the computing system to modify parameters of the polygonal approximation algorithm when applied to subsumed contours relative to when applied to non-subsumed contours.

19. The computing system claim 13, wherein the computer-executed instructions cause the computing system to, prior to applying the polygonal approximation algorithm, obtain the jaggedness parameter for the polygonal outline, wherein the jaggedness parameter affects how many polygonal vertices are present in the polygonal outline mask.

20. The computing system claim 13, wherein the image of the object is further generated by filling a negative space between the portion of the source image and the portion of the second background with designated content.

* * * * *